United States Patent
Bastien et al.

(10) Patent No.: US 12,169,394 B2
(45) Date of Patent: Dec. 17, 2024

(54) METHOD OF OPTIMIZING EXECUTION OF A FUNCTION ON A CONTROL SYSTEM AND APPARATUS FOR THE SAME

(71) Applicant: WOVEN BY TOYOTA, INC., Tokyo (JP)

(72) Inventors: Jean-Francois Bastien, Tokyo (JP); Dmitri Lapanik, Yokohama (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 427 days.

(21) Appl. No.: 17/731,586

(22) Filed: Apr. 28, 2022

(65) Prior Publication Data
US 2023/0350354 A1  Nov. 2, 2023

(51) Int. Cl.
G05B 13/04  (2006.01)
G06N 20/00  (2019.01)

(52) U.S. Cl.
CPC ........... *G05B 13/042* (2013.01); *G06N 20/00* (2019.01)

(58) Field of Classification Search
CPC ...... G05B 13/042; G06F 9/5038; G06N 20/00
USPC ......................................................... 700/29
See application file for complete search history.

(56) References Cited

U.S. PATENT DOCUMENTS

| | | | |
|---|---|---|---|
| 7,743,365 B2 | 6/2010 | Wehrs et al. | |
| 8,776,074 B1 * | 7/2014 | Heisler | G06F 9/4881 |
| | | | 718/103 |
| 2009/0320039 A1 | 12/2009 | Garbow et al. | |
| 2013/0007730 A1 | 1/2013 | Hotra et al. | |
| 2017/0026305 A1 * | 1/2017 | Barrett | H04L 47/70 |
| 2018/0189082 A1 | 7/2018 | Zhang | |
| 2020/0383170 A1 | 12/2020 | Ganapathy et al. | |
| 2021/0055973 A1 * | 2/2021 | Pendar | G06N 20/00 |
| 2021/0163021 A1 | 6/2021 | Frazzoli et al. | |
| 2021/0303389 A1 * | 9/2021 | Gadi | G06N 3/08 |

* cited by examiner

*Primary Examiner* — Chun Cao
(74) *Attorney, Agent, or Firm* — Sughrue Mion, PLLC

(57) ABSTRACT

A method of optimizing execution of a control function on a control system including a plurality of hardware components includes: determining a processing capability and a communication capability of each of the plurality of hardware components; generating a plurality of solutions for executing the control function using the plurality of hardware components based on a processing capability and a communication capability of each of the plurality of hardware components; scoring the plurality of generated solutions based on a desirability of each solution; selecting a solution having a highest desirability score; and controlling the control system to execute the control function based on the selected solution.

21 Claims, 3 Drawing Sheets

METHOD OF OPTIMIZING EXECUTION OF A FUNCTION ON A CONTROL SYSTEM AND APPARATUS FOR THE SAME

BACKGROUND

1. Technical Field

The present disclosure relates to control system operations, and in particular, relates to optimizing a control system for executing a control function on multiple hardware components based on the characteristics of the hardware components and communication connections between the hardware components.

2. Description of Related Art

As the development of control systems for devices that contain embedded hardware and software has evolved, so too has the development rate of the hardware components used in devices. When a device's operating system platform, libraries, or applications on top of the platform are developed, the operating system is designed specifically for the hardware components (e.g., sensors, microprocessors, cameras, etc.) included in the device. Accordingly, when a new model is designed that includes new hardware components, or when a hardware component on an existing model is substituted with a different hardware component, the software must be manually updated to ensure compatibility and continued functionality of the software.

SUMMARY

When a device that includes new hardware components is designed, or when a hardware component on an existing device is substituted with a different hardware component, software engineers are required to manually determine the "place" that a process is executed and the "route" through which the data signals are sent in the device when developing an operating system. This process is time consuming, labor intensive, difficult to test and simulate in software, and limits the pace at which hardware components can be incorporated with an existing operating system platform.

The present disclosure provides a problem solving architecture that, statically ahead of time or dynamically at runtime, determines the "place" and "route" in which a solution to a problem is executed.

According to an aspect of the disclosure, a method of optimizing execution of a control function on a control system including a plurality of hardware components may include: determining a processing capability and a communication capability of each of the plurality of hardware components; generating a plurality of solutions for executing the control function using the plurality of hardware components based on a processing capability and a communication capability of each of the plurality of hardware components; scoring the plurality of generated solutions based on a desirability of each solution; selecting a solution having a highest desirability score; and controlling the control system to execute the control function based on the selected solution.

The method may further include optimizing the plurality of generated solutions to increase a desirability of each solution.

The method may further include obtaining one or more valid solutions from among the plurality of generated solutions, the valid solutions being capable of executing the control function with the plurality of hardware components; and modifying the valid solutions to obtain one or more optimized solutions with an improved desirability score using machine learning.

The method may further include modifying the plurality of generated solutions to improve the desirability score of each solution using machine learning; and selecting a solution among the plurality of modified solutions having a highest desirability score as the selected solution.

The method may further include generating the plurality of solutions over a predetermined period of time. A solution with a highest desirability score at an end of the period of time may be selected as the selected solution.

The method may further include ending generation of the plurality of solutions in response to a solution having a desirability score above a predetermined threshold being obtained.

Each generated solution may indicate one or more hardware components, among the plurality of hardware components, on which the control function is executed and a route in which data is sent to and from the one or more hardware components.

According to another aspect of the disclosure, a control system may include at least one memory storing instructions; at least one main processor configured to execute the instructions; and a plurality of hardware components in communication with the at least one main processor, each of the plurality of hardware components comprising at least one processor. The at least one main processor may be configured to execute the instructions to: determine a processing capability and a communication capability of each of the plurality of hardware components; generate a plurality of solutions for executing the control function using the plurality of hardware components based on a processing capability and a communication capability of each of the plurality of hardware components; score the plurality of generated solutions based on a desirability of each solution; select a solution having a highest desirability score; and control the control system to execute the control function based on the selected solution.

The at least one main processor may be further configured to execute the instructions to optimize the plurality of generated solutions to increase a desirability of each solution.

The at least one main processor may be further configured to execute the instructions to: obtain one or more valid solutions from among the plurality of generated solutions, the valid solutions being capable of executing the control function with the plurality of hardware components; and modify the valid solutions to obtain one or more optimized solutions with an improved desirability score using machine learning.

The at least one main processor may be further configured to execute the instructions to: modify the plurality of generated solutions to improve the desirability score of each solution using machine learning; and select a solution among the plurality of modified solutions having a highest desirability score as the selected solution.

The at least one main processor may be further configured to execute the instructions to generate the plurality of solutions over a predetermined period of time. A solution with a highest desirability score at an end of the period of time may be selected as the selected solution.

The at least one main processor may be further configured to execute the instructions to end generation of the plurality of solutions in response to a solution having a desirability score above a predetermined threshold being obtained.

Each generated solution indicates one or more hardware components, among the plurality of hardware components, on which the control function is executed and a route in which data is sent to and from the one or more hardware components.

According to yet another aspect of the disclosure, a non-transitory computer-readable medium may store instructions that, when executed by at least one processor of an electronic device, cause the at least one processor to: determine a processing capability and a communication capability of each of a plurality of hardware components; generate a plurality of solutions for executing a control function using the plurality of hardware components based on a processing capability and a communication capability of each of the plurality of hardware components; score the plurality of generated solutions based on a desirability of each solution; select a solution having a highest desirability score; and control the control system to execute the control function based on the selected solution.

The at least one processor may be further configured to execute the instructions to optimize the plurality of generated solutions to increase a desirability of each solution.

The at least one processor may be further configured to execute the instructions to: obtain one or more valid solutions from among the plurality of generated solutions, the valid solutions being capable of executing the control function with the plurality of hardware components; and modify the valid solutions to obtain one or more optimized solutions with an improved desirability score using machine learning.

The at least one processor may be further configured to execute the instructions to: modify the plurality of generated solutions to improve the desirability score of each solution using machine learning; and select a solution among the plurality of modified solutions having a highest desirability score as the selected solution.

The at least one processor may be further configured to execute the instructions to generate the plurality of solutions over a predetermined period of time. A solution with a highest desirability score at an end of the period of time may be selected as the selected solution.

The at least one processor may be further configured to execute the instructions to end generation of the plurality of solutions in response to a solution having a desirability score above a predetermined threshold being obtained.

Each generated solution may indicate one or more hardware components, among the plurality of hardware components, on which the control function is executed and a route in which data is sent to and from the one or more hardware components.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION

A method according to the present disclosure provides a control system optimization architecture that, statically ahead of time or dynamically at runtime, determines a the "place" and "route" in which a function is executed. In devices having complex control systems, such as vehicles, devices that operate on the Internet of Things (IoT), and the like, there may be a plurality of hardware components that all include computer processors and/or special purpose computation devices capable of executing a program or its subset. Each of these components may be interconnected using different types of connections, and communication internally with different software-based mechanisms. Each connection type may have different properties that are limited by the capabilities of the hardware component. Additionally, each hardware component may have different processing capabilities based on the type of processor included in the hardware component, and availability of other resources such as memory. The provided control system optimization architecture is able to determine, statically ahead of time or dynamically at runtime, how to best carry out a desired function with the given hardware components.

The solution for place and route decides where code will execute, and how communications are transported. For example, in a connected vehicle with multiple computer electronic control units (ECUs) on board, code will execute on each ECU as well as in the cloud. Within an ECU, code might execute on the main central processing unit (CPU), on an accelerator, or graphics processing unit (GPU), and might be attached to particular cores as well as to particular hypervisors, operating systems, processes, or threads. There can be one or multiple copies of code, to dynamically adapt to circumstances (such as redundancy needs, power constraints, connectivity issues, etc.). The communication mechanisms between different functions are determined based on place and route. For example, communications might occur over Ethernet, Wifi, 5G, controller area network (CAN), shared memory, pipes, circular buffers, or other communication mechanisms.

Figure 1:
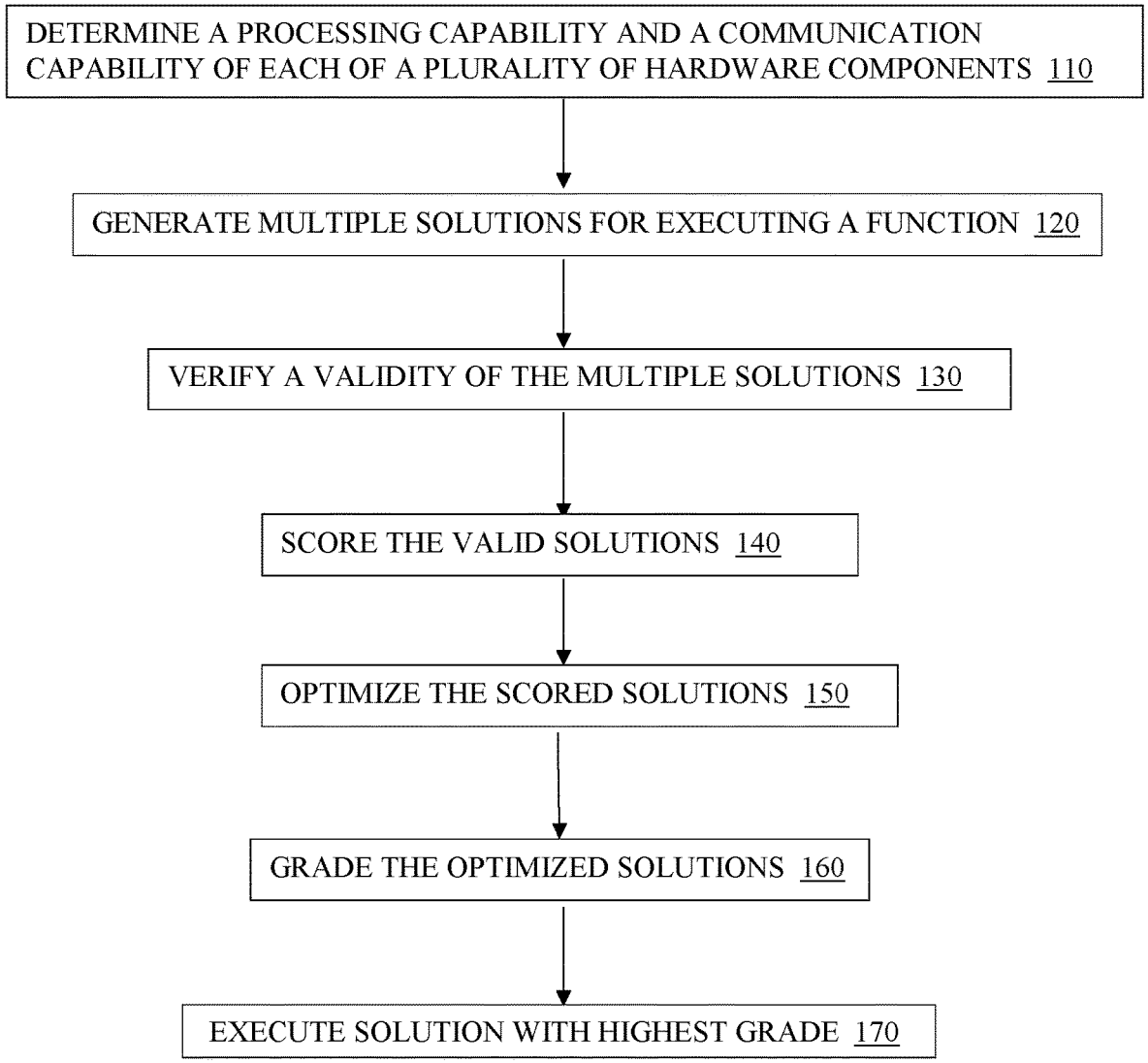
FIG. 1 is a flowchart of an overview of a method of optimizing execution of a function on a control system according to an embodiment.

FIG. 1 is a flowchart of an overview of a method of optimizing execution of a function on a control system according to an embodiment.

Referring to FIG. 1, at operation 110, a processing capability and a communication capability of each of a plurality of hardware components in the control system may be determined. This may include topology information that maps the functions and communications. The topology information may include each computation device, such as CPU, their capabilities (number of cores, compute capabilities, reliability characteristics, etc), communications between them, available cloud resources, and the like.

Some of the communication data streams may be generated by actual hardware (for example: camera, lidar, sonar, radar), whereas other data streams may be generated by software (individual functions). The hardware-generated communications can also be simulated, either by replaying prior recorded data streams, or by emulating the hardware using software.

At operation 120, multiple solutions for executing the control function may be generated within the constraints of the obtained processing capabilities and communication capabilities. The solutions may include one or more places (e.g. hardware components) where the processing is perform and routes in which data is sent between the one or more places.

According to an embodiment, the multiple solutions can be generated by making an initial guess, which can be a manual input or an input generated by a computer, and optimizing a target function using a function optimization technique such as discrete optimization, linear programming, or the like.

According to another embodiment, the multiple solutions can be generated using stochastic optimization. This embodiment may perform random trying using heuristics. In implementing stochastic optimization, transformations may be taught to a modification algorithm in a manner which is likely to find better solutions.

According to another embodiment, the solutions may be generated using machine learning with pre-learned solutions. The pre-learned solutions may be obtained in a computationally expensive manner, such as through stochastic optimization, through initial guesses with target optimization, or through hand delivery by humans, but the disclosure is not limited to these examples.

At operation 130, once the multiple solutions are generated, a validity of each solution may be verified. That is, method 100 determines which solutions are able to solve the problem (perform the control function) based on given constraints (the characteristics of the hardware components and communication routes between the hardware components).

If a valid solution cannot be found, then the verifier (such as an SMT solver) can output a diagnostic of what prevents a valid solution from being found. The diagnostics may then be performed by human intervention or through methods using machine learning.

At operation 140, the valid solutions may be scored based on desirability using a scoring algorithm. For example, the valid solutions may be scored based on power usage, low latency, safety margin, freedom from interference, enabling features, saturating commercial channels, having a smaller security risk. However, the disclosure is not limited to these examples.

If solutions are found but score insufficiently high, then the verifier and the scoring algorithm can output diagnostics which humans or machine learning based models can analyze to find design decisions which over constrain the solution and prevent a higher score.

At operation 150, the scored solutions may be optimized. That is, a plurality of the scored solutions may be used as starting points for subsequent modifications to obtain better solutions to the problem. According to an embodiment, the top scoring solutions may be selected for modification.

The modified solutions that obtain higher scores may then be selected as the optimized solutions. According to an embodiment, the modified solutions that that become invalid may be selected as optimizes solutions that may be further optimized to obtain a valid solution. This may provide solutions with higher scores, thereby leading the solution algorithm to avoid local optimums.

Non-optimal modification may also be performed in machine learning based optimization such as Bayesian methods. These non-optimal solutions can improve the optimization strategy of a machine learning based model.

The optimization modification may be performed iteratively until a time limit is reached, until a solution having a score above a predetermined threshold is obtained, until scores stop changing significantly, or a difference between desirability scores of two solutions is above a threshold.

When optimizing the solutions, some of the properties of each function can be programmatically derived. For example, the code can be compiled and analyzed to estimate how much time it takes to execute. This programmatically derived information is treated as input to the algorithm, in the same way developer-provided information is input into an algorithm.

When optimizing solutions, some of the properties of each communication can also be programmatically derived. For example two functions with different safety levels can communicate, but may only use a communication mechanism which upholds the higher safety level requirements (such as having checksums and heartbeats).

At operation 160, the optimized solutions may be graded. The grading may be performed based on the same criteria as the scoring using an algorithm similar to the scoring algorithm.

At operation 170, a solution with the highest grade may be performed by the control system. That is, the solution having the highest grade will designate one or more components that perform the necessary processing for the control function as well as the routes of communication to move the data to locations where it is needed for performing the control function.

Figure 2:
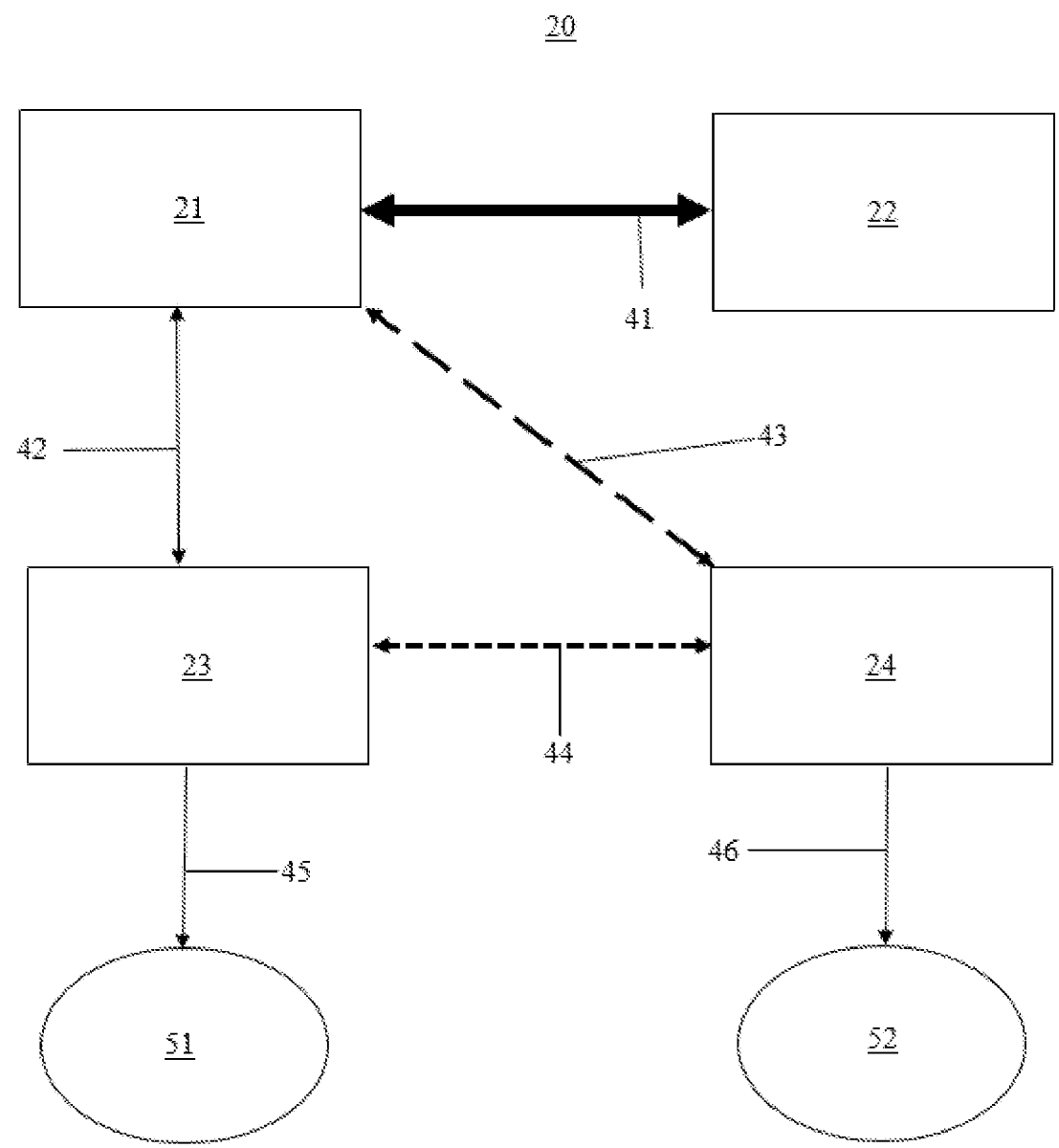
FIG. 2 is a diagram of an example control system according to an embodiment.

FIG. 2 is a diagram of a control system according to an embodiment.

As shown in FIG. 2, the control system 20 includes multiple hardware components 21, 22, 23, and 24, multiple communication routes 41, 42, 43, 44, 45, and 46, and multiple output devices 51 and 52.

Each of the hardware component 21-24 may have different characteristics and capabilities. For example, the hardware components 21-24 may have different amounts of processing power, different types of processors, different an amount of memory, and/or access to different resources. However, the disclosure is not limited the these examples.

Similarly, each of the communication routes 41, 42, 43, 44, 45, and 46 may have different characteristics. For example, each of the communication routes may be able to transfer data at different speeds, may use different types of encryption, and/or may have different levels of safety. However, the disclosure is not limited to these examples. For example, in the embodiment shown in FIG. 2, route 41 may provide the highest data transfer speeds, route 43 may encode the data using a first technique, route 44 may encode the data using a second technique, and routes 42, 45, and 46 may provide low transfer speeds.

Output devices 51 and 52 may be controlled by the control function. For example, if the control system 20 is for a vehicle, the hardware component 23 may be the engine control unit (ECU), the hardware component 24 may be the transmission control unit (24), output device 51 may be an engine, and output device 52 may be a transmission.

According to an embodiment, the method 100 of optimizing a control system to execute a control function may include obtaining an optimized place to perform the processing of a control function and obtaining optimized communication routes to transmit the corresponding data based on the processing characteristics of the hardware components 21-24 and the characteristics of the communication routes 41-46.

Figure 3:
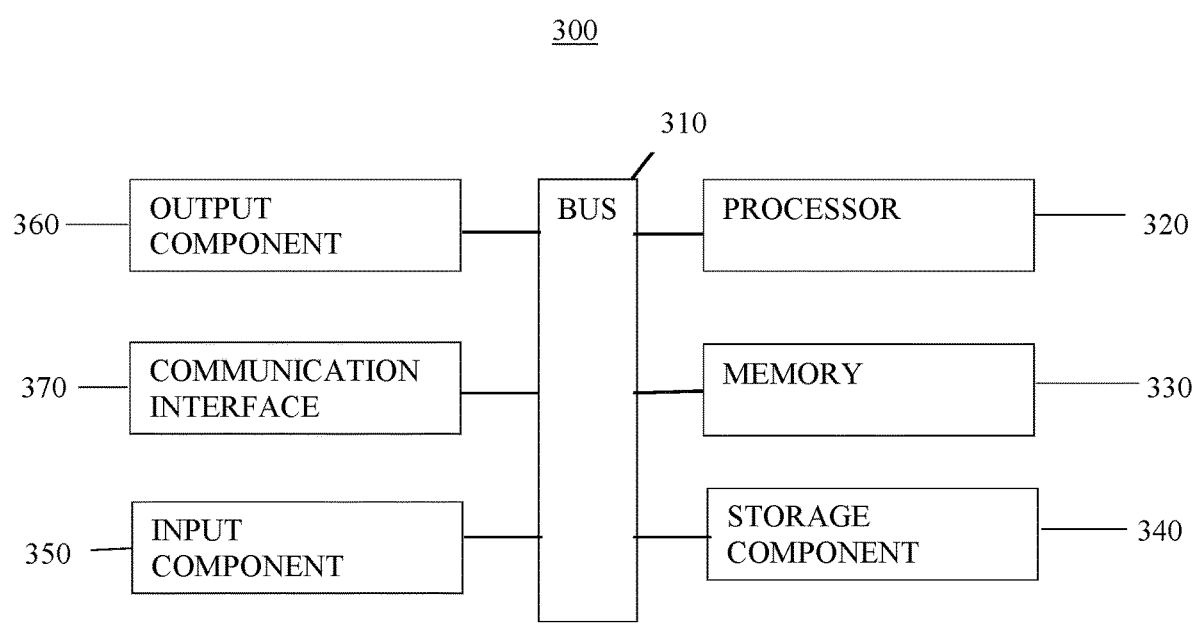
FIG. 3 is a diagram of an example hardware component of a control system according to an embodiment.

FIG. 3 is a diagram of a hardware component according to an embodiment. As shown in FIG. 3, the hardware component 300 may include a bus 310, a processor 320 (or at least one processor), a memory 330 (or at least one memory), a storage component 340, an input component 350, an output component 360, and a communication interface 370.

The bus 310 may include a component that permits communication among the components of the device 300. That is, the bus 310 is a communication system or subsystem that permits the transfer of data and information between the components of the device 300.

The processor 320 may be implemented in hardware, firmware, or a combination of hardware and software. The processor 320 may include at least one of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some embodiments, the processor 320 includes one or more processors capable of being programmed to perform a function.

The memory 330 stores information and/or instructions for use by the processor 320. The memory 330 may include at least one of a random access memory (RAM), a read only memory (ROM), and/or another type of dynamic or static storage device (e.g., a flash memory, a magnetic memory, and/or an optical memory) for storing information and/or instructions.

The storage component 340 may store information and/or software related to the operation and use of the device 300. For example, the storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 350 may include a component that permits the device 300 to receive information, such as via user input (e.g., a touch screen display, a keyboard, a keypad, a mouse, a button, a switch, and/or a microphone). Additionally, or alternatively, the input component 350 may include a sensor for sensing information (e.g., a global positioning system (GPS) component, an accelerometer, a gyroscope, and/or an actuator). The output component 360 may include a component that provides output information from the device 300 (e.g., a display, a speaker, one or more light-emitting diodes (LEDs), an interface for connecting to an external display or speaker, etc.).

The communication interface 370 may include a transceiver-like component (e.g., a transceiver and/or a separate receiver and transmitter) that enables the device 300 to communicate with other devices, such as via a wired connection, a wireless connection, or a combination of wired and wireless connections. The communication interface 370 may permit the device 300 to receive information from another device and/or provide information to another device. For example, the communication interface 370 may include an Ethernet interface, an optical interface, a coaxial interface, an infrared interface, a radio frequency (RF) interface, a universal serial bus (USB) interface, a Wi-Fi interface, a cellular network interface, or the like. The communication interface 370 may act and an end of a communication path within a control system, such as an end of any one of the communication paths 41-46 of FIG. 2.

The device 300 may perform one or more processes for executing the control function. The device 300 may perform these processes via the processor 320 executing software instructions stored in a non-transitory computer-readable medium, such as the memory 330 and/or the storage component 340. A computer-readable medium is defined herein as a non-transitory memory device. A memory device includes memory space within a single physical storage device or memory space spread across multiple physical storage devices.

Software instructions may be read into the memory 330 and/or the storage component 340 from another computer-readable medium or from another device via the communication interface 370. When executed, software instructions stored in the memory 330 and/or the storage component 340 may cause the processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, the device 300 may include additional components, fewer components, different components, or differently arranged components than those shown in FIG. 3. Additionally, or alternatively, a set of components (e.g., one or more components) of the device 300 may perform one or more functions described as being performed by another set of components of device 300.

As described above, methods and systems according to embodiments optimize usage of a control system by iteratively generating multiple solution and selecting the best solution based on desired criteria. The solutions may be enhanced one or more times before the best solution is selected for execution.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of optimizing execution of a control function on a control system comprising a plurality of hardware components, the method comprising:
   determining a processing capability and a communication capability of each of the plurality of hardware components;
   generating a plurality of solutions for executing the control function using the plurality of hardware components based on a processing capability and a communication capability of each of the plurality of hardware components;
   scoring the plurality of generated solutions based on a desirability of each solution;
   selecting a solution having a highest desirability score; and
   controlling the control system to execute the control function based on the selected solution.

2. The method according to claim 1, further comprising optimizing the plurality of generated solutions to increase a desirability of each solution.

3. The method according to claim 1, further comprising:
   obtaining one or more valid solutions from among the plurality of generated solutions, the valid solutions being capable of executing the control function with the plurality of hardware components; and
   modifying the valid solutions to obtain one or more optimized solutions with an improved desirability score using machine learning.

4. The method according to claim 1, further comprising:
   modifying the plurality of generated solutions to improve the desirability score of each solution using machine learning; and
   selecting a solution among the plurality of modified solutions having a highest desirability score as the selected solution.

5. The method according to claim 1, further comprising generating the plurality of solutions over a predetermined period of time, and
   wherein a solution with a highest desirability score at an end of the period of time is selected as the selected solution.

6. The method according to claim 1, further comprising ending generation of the plurality of solutions in response to a solution having a desirability score above a predetermined threshold being obtained.

7. The method according to claim 1, wherein each generated solution indicates one or more hardware components, among the plurality of hardware components, on which the control function is executed and a route in which data is sent to and from the one or more hardware components.

8. A control system comprising:
   at least one memory storing instructions;
   at least one main processor configured to execute the instructions; and
   a plurality of hardware components in communication with the at least one main processor, each of the plurality of hardware components comprising at least one processor,
   wherein the at least one main processor is configured to execute the instructions to:
      determine a processing capability and a communication capability of each of the plurality of hardware components;
      generate a plurality of solutions for executing the control function using the plurality of hardware components based on a processing capability and a communication capability of each of the plurality of hardware components;
      score the plurality of generated solutions based on a desirability of each solution;
      select a solution having a highest desirability score; and
      control the control system to execute the control function based on the selected solution.

9. The system according to claim 8, wherein the at least one main processor is further configured to execute the instructions to optimize the plurality of generated solutions to increase a desirability of each solution.

10. The system according to claim 8, wherein the at least one main processor is further configured to execute the instructions to:
    obtain one or more valid solutions from among the plurality of generated solutions, the valid solutions being capable of executing the control function with the plurality of hardware components; and
    modify the valid solutions to obtain one or more optimized solutions with an improved desirability score using machine learning.

11. The system according to claim 8, wherein the at least one main processor is further configured to execute the instructions to:
    modify the plurality of generated solutions to improve the desirability score of each solution using machine learning; and
    select a solution among the plurality of modified solutions having a highest desirability score as the selected solution.

12. The system according to claim 8, wherein the at least one main processor is further configured to execute the instructions to generate the plurality of solutions over a predetermined period of time, and
    wherein a solution with a highest desirability score at an end of the period of time is selected as the selected solution.

13. The system according to claim 8, wherein the at least one main processor is further configured to execute the instructions to end generation of the plurality of solutions in response to a solution having a desirability score above a predetermined threshold being obtained.

14. The system according to claim 8, wherein each generated solution indicates one or more hardware components, among the plurality of hardware components, on which the control function is executed and a route in which data is sent to and from the one or more hardware components.

15. A non-transitory computer-readable medium storing instructions that, when executed by at least one processor of an electronic device, cause the at least one processor to:
    determine a processing capability and a communication capability of each of a plurality of hardware components;
    generate a plurality of solutions for executing a control function using the plurality of hardware components based on a processing capability and a communication capability of each of the plurality of hardware components;
    score the plurality of generated solutions based on a desirability of each solution;
    select a solution having a highest desirability score; and
    control the control system to execute the control function based on the selected solution.

16. The non-transitory computer-readable medium according to claim 15, wherein the at least one processor is further configured to execute the instructions to optimize the plurality of generated solutions to increase a desirability of each solution.

17. The non-transitory computer-readable medium according to claim 15, wherein the at least one processor is further configured to execute the instructions to:

obtain one or more valid solutions from among the plurality of generated solutions, the valid solutions being capable of executing the control function with the plurality of hardware components; and modify the valid solutions to obtain one or more optimized solutions with an improved desirability score using machine learning.

18. The non-transitory computer-readable medium according to claim 15, wherein the at least one processor is further configured to execute the instructions to:

modify the plurality of generated solutions to improve the desirability score of each solution using machine learning; and select a solution among the plurality of modified solutions having a highest desirability score as the selected solution.

19. The non-transitory computer-readable medium according to claim 15, wherein the at least one processor is further configured to execute the instructions to generate the plurality of solutions over a predetermined period of time, and wherein a solution with a highest desirability score at an end of the period of time is selected as the selected solution.

20. The non-transitory computer-readable medium according to claim 15, wherein the at least one processor is further configured to execute the instructions to end generation of the plurality of solutions in response to a solution having a desirability score above a predetermined threshold being obtained.

21. The non-transitory computer-readable medium according to claim 15, wherein each generated solution indicates one or more hardware components, among the plurality of hardware components, on which the control function is executed and a route in which data is sent to and from the one or more hardware components.

\* \* \* \* \*